Patented Jan. 5, 1937

2,066,941

UNITED STATES PATENT OFFICE 2,066,941

INSECTICIDE AND PROCESS FOR MAKING THE SAME

Louis N. Markwood, Washington, D. C.;
dedicated to the free use of the Public

No Drawing. Application July 9, 1935,
Serial No. 30,536

6 Claims. (Cl. 167—34)

(Granted under the act of March 3, 1883, as amended April 30, 1928; 370 O. G. 757)

This application is made under the act approved March 3, 1883, as amended by the act of April 30, 1928, and the invention herein described may be manufactured and used by or for the Government for governmental purposes without the payment to me of any royalty thereon.

I hereby dedicate the invention herein described to the free use of the public, to take effect upon the granting of a patent to me.

My invention relates to a water-soluble nicotine compound suitable for use as an insecticide.

The object of my invention is to make a water-soluble nicotine preparation which can be marketed in the form of a dry powder, which is non-hygroscopic and stable, which forms a practically neutral solution in water, which can be sold in less expensive types of containers than are required for liquids, and in which the nicotine is combined with an inexpensive fixative.

The product herein claimed and for which Letters Patent are requested is designated nicotine humate. It is the compound formed by the combination of nicotine with humic acid.

The use of nicotine as an insecticide is well known. It has been used chiefly in water-soluble form, such as the sulphate or as the free alkaloid. Nicotine sulphate of commercial grade has the following disadvantages:

(1) The product is a liquid consisting of about 40 percent by weight of nicotine, and has the drawbacks of a liquid product, namely, it requires a more expensive container than does a dry powder, and it is likely to leak out of its container or to evaporate if the container is left open.

(2) Commercial nicotine sulphate solution is slightly acid in reaction due to combining nicotine, a weak base with sulphuric acid, a strong acid.

The nicotine humate of my invention does not have these drawbacks.

Nicotine humate is a dark brown to black solid, soluble in water to a brownish solution, stable under ordinary conditions of handling, and equivalent insecticidally to nicotine sulphate in solution of equal nicotine content. As prepared in the laboratory from materials of commercial grade it contains 33-34 percent of nicotine, but the nicotine content varies somewhat, as hereafter shown, according to the source of humic material.

In making nicotine humate, I bring together nicotine and humic acid, which combine in the presence of water to form nicotine humate. The humic acid may be derived from any natural humic substance, such as peat or lignite, or it may be manufactured in any known manner, as, for example, from sugar.

A preferred method of practicing my invention is through the interaction of nicotine and peat. In a co-pending application for patent, filed September 19, 1934, Serial No. 744,636, I have described a process for making a reaction product of nicotine and peat, which product is a substantially water-insoluble nicotine-peat product. The liquid portion obtained in this reaction contains nicotine humate in solution. When this solution is evaporated to dryness on the steam bath nicotine humate is found deposited as a dark brown to black residue. Nicotine humate may, therefore, be regarded as a by-product in the manufacture of nicotine peat, or vice versa.

Peat is partially decomposed vegetable organic matter containing acid bodies known collectively as "humic acid", the constitution of which is unknown. These acid bodies are more or less neutralized by basic elements, such as calcium, magnesium, etc., according to environmental conditions. It is therefore advantageous first to treat most types of peat with an acid to de-base the peat and so liberate the humic acid, as described in the pending application referred to above. In this way the yield of nicotine humate is increased over that obtained from peat not so treated.

The yield of nicotine humate is also enhanced by treating a given quantity of peat with no less an amount of nicotine than is equivalent to the free humic acid present. This amount of nicotine can be readily determined by testing the liquid after reaction with litmus test paper—if it is acid the amount of nicotine is insufficient, if it is alkaline the amount is greater than necessary.

An illustration of the process I employ, such as will enable anyone skilled in the art to reproduce the same, is as follows:

I macerate 20 grams of air-dry New Jersey peat (a highly calcareous reed peat) with 250 cc. of 3 percent hydrochloric acid for several hours. The peat is filtered off and washed free from hydrochloric acid and soluble salts. It is then treated on the steam bath for a short period (15 minutes to 1 hour) with a solution of 4 grams nicotine in 100 cc. water. The insoluble portion (nicotine peat) is separated, as by filtration, and washed until the filtrate is substantially free from nicotine (as shown by only a slight opalescence with silicotungstic acid). The filtrate is evaporated by means of steam or other moderate heat, more advantageously under reduced pressure but not necessarily so, to dryness. The dried dark deposit, which is nicotine humate, is removed, ground to a powder, and held for use.

The yield of nicotine humate obtained in the above manner, viz., where 20 grams of hydrochloric acid-treated peat are treated with 4 grams nicotine, amounted in an actual case to 3.6 grams analyzing 34.1 percent nicotine. Where the quantity of nicotine employed was 3.5 grams, the yield of nicotine humate was 2.8 grams analyzing 33.5 percent nicotine, thus showing a lowered yield with the lesser amount of nicotine.

Where the same quantity of peat, viz., 20 grams, without any preliminary acid treatment, was treated with 4 grams nicotine, the yield of nicotine humate was only 0.8 gram analyzing 33.9 percent nicotine. It is clearly evident that acid treatment improves the yield. In this case the amount of nicotine present was considerably in excess of that required. This was shown by the marked alkalinity of the solution after reaction, as well as by the odor of nicotine freely evident during evaporation.

Another method which I may employ to prepare nicotine humate is the direct combination of nicotine with humic acid, the latter being prepared in any known manner, such as by alkaline extraction of peat or lignite and subsequent precipitation of the humic acid by acidification, or by humification of sugar. The humic acid, which is insoluble in water, is treated with sufficient nicotine to effect solution. On evaporation to dryness, nicotine humate is deposited. It is understood, of course, that the product may be left and utilized in solution, but it is usually more desirable to obtain it in dry form.

As illustrative of the manner of preparing nicotine humate by this process, the following experiment is cited: Fifty grams of moss peat were digested on the steam bath with a 2 percent $Na_2CO_3$ solution. After filtration the liquid was acidified with HCl and the precipitated humic acid was thoroughly washed. To an aqueous suspension of the humic acid was added an aqueous solution of nicotine in slight excess, as indicated by litmus, as well as by persistence of the nicotine odor and by complete solution of the humic acid. On evaporation of the solution to dryness there was deposited the black residue of nicotine humate, which in this case contained 28.6 percent nicotine.

The percentage of nicotine in nicotine humate is constant for a given type of humic material but varies somewhat with different types or sources. This circumstance follows from the differences in humic acid of diverse origin. Nicotine humate made from the same moss peat used above, but by the direct action of nicotine on the HCl-treated peat, contained 29.7 percent nicotine, a value which is not significantly different from that obtained above.

Having thus described my invention, what I claim for Letters Patent is:

1. The product of the reaction between nicotine and humic acid.
2. An insecticidal composition comprising the product of the reaction between nicotine and humic acid.
3. The water-soluble product of the reaction between nicotine and peat.
4. In a process for preparing nicotine humate the step which comprises bringing together in intimate contact an aqueous solution of nicotine and humic acid.
5. In a process for preparing nicotine humate the steps which comprise bringing together in intimate contact an aqueous solution of nicotine and peat, allowing the mixture to react, and separating the liquid portion.
6. In a process for preparing nicotine humate the steps which comprise treating peat with an acid from the group consisting of mineral acids and acetic acid, washing said peat to remove soluble matter, bringing together in intimate contact an aqueous solution of nicotine and said peat, and separating the liquid portion.

LOUIS N. MARKWOOD.